(12) United States Patent
Watanabe et al.

(10) Patent No.: US 6,547,442 B1
(45) Date of Patent: Apr. 15, 2003

(54) ROLLING BEARING

(75) Inventors: Toshiharu Watanabe, Sakai (JP); Hajime Tazumi, Higashiosaka (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/786,320

(22) PCT Filed: Aug. 7, 2000

(86) PCT No.: PCT/JP00/05300

§ 371 (c)(1), (2), (4) Date: Mar. 2, 2001

(87) PCT Pub. No.: WO01/11252

PCT Pub. Date: Feb. 15, 2001

(30) Foreign Application Priority Data

Aug. 9, 1999 (JP) .......................................... 11-225287

(51) Int. Cl.[7] .............................................. F16C 33/62
(52) U.S. Cl. ........................ 384/492; 384/559; 29/898; 29/898.14; 29/898.06; 29/898.063
(58) Field of Search ................................ 384/492, 494, 384/527, 548, 559, 560, 618, 621, 622; 148/622, 316, 22; 29/898, 898.14, 898.04, 898.052, 898.06, 898.061, 898.062, 898.063, 898.066

(56) References Cited

U.S. PATENT DOCUMENTS

| 4,023,988 A | | 5/1977 | Stickels et al. ............ 148/12.4 |
|---|---|---|---|
| 4,225,365 A | * | 9/1980 | Rice ............................. 148/330 |
| 4,343,661 A | * | 8/1982 | Rice ............................. 148/586 |

FOREIGN PATENT DOCUMENTS

| JP | 4-28845 A | * | 1/1992 |
|---|---|---|---|
| JP | 05-195069 | | 8/1993 |
| JP | 09-242762 | | 9/1997 |
| JP | 2775614 | | 5/1998 |
| JP | 11-302789 | | 2/1999 |
| JP | 11-106824 | | 4/1999 |
| WO | WO 80/01083 | | 5/1980 |

* cited by examiner

Primary Examiner—Pam Rodriguez
(74) Attorney, Agent, or Firm—Smith, Gambrell & Russell, LLP

(57) ABSTRACT

A structure of at least a stationary-side race of a bearing is transformed into a lower bainite structure through an isothermal transformation treatment. Furthermore, the adjustment is made for hardness to HRC=54 to 64, an amount of residual austenite to not more than 5% and an area percentage of 0.8 $\mu$m or longer carbide to not more than 20% based on the total area of secondary carbide. Thus is prevented the occurrence of a white layer in the rolling bearing.

6 Claims, No Drawings

ROLLING BEARING

TECHNICAL FIELD

The present invention relates to a rolling bearing.

BACKGROUND ART

SUJ2, a kind of bearing steel, has been widely used as a material for races and balls which are parts of a rolling bearing. A large size rolling bearing employs SUJ3 or SUJ5 improved in hardenability.

To extend the service life of the rolling bearing, wear of a raceway surface or flaking from the raceway surface, called "pitting", must be reduced. For this purpose, the bearing steel is subjected to hardening/tempering treatment for transformation to a tempered martenistic structure, thereby adjusting balance between hardness and toughness.

As an alternative approach to extend the service life, compressive residual stress is imparted to the raceway surface by a shot peening treatment. A technique for better use of the shot peening treatment is disclosed in, for example, an official gazette of Japanese unexamined patent publication 5(1993)-195069. According to this official gazette, attention is paid to residual austenite which is left untransformed during the hardening treatment. The bearing has its surface portion martensitically transformed by the shot peening treatment for accomplishment of the hardness while maintaining the residual austenite in its interior portion as it is, thereby accomplishing ductility.

Recently, however, bearings for automotive engine auxiliaries are used under more severe conditions so that a premature flaking phenomenon has manifested itself which is difficult for the conventional techniques to prevent. The premature flaking is a phenomenon where the raceway surface suffers rapid flaking due to an altered structure called "white layer" produced in the raceway surface. The premature flaking phenomenon is caused by high vibration and high impact load locally applying high shearing stress to the raceway surface.

As an approach to the prevention of the occurrence of such a white layer, proposal has been made to increase the viscosity of a grease base oil used for lubrication. However, this proposal has a problem of limitation on the lubrication method.

Another proposal has been made to make the material structure more stabilized or less susceptible to local deformation. For instance, it is proposed to reduce the amount of residual austenite by a subzero treatment because the residual austenite tends to decompose to promote the white layer formation. In this case, as well, the occurrence of the white layer is not effectively prevented.

In view of the foregoing problem, it is an object of the present invention to provide a rolling bearing adapted for effective prevention of the occurrence of the white layer.

DISCLOSURE OF THE INVENTION

In accordance with the present invention for achieving the above object, a rolling bearing comprising races and balls each constructed from steel is characterized in that a structure of at least a stationary-side race is transformed into a lower bainite structure through isothermal transformation and is adjusted for hardness to HRC=54 to 64, an amount of residual austenite to not more than 5%, and an area percentage of $0.8 \mu m$ or longer carbide to not more than 20% based on a total area of secondary carbide.

In the rolling bearing of the above arrangement, at least the stationary-side race has the lower bainite structure obtained through isothermal transformation. This results in a reduced amount of residual austenite as well as in uniform and fine dispersion of carbide particles dispersing operating stress and hence, the formation of the white layer is effectively prevented. As a result, the rolling bearing can be stably used over an extended period of time under conditions of high vibration and high impact stress.

Specifically, the inventors of the present invention have found that high shearing stress causative of the white layer can be more effectively dispersed in the lower bainite structure with more uniform and fine distribution of carbide particles as compared with the conventional tempered martensitic structure obtained by the normal hardening/tempering treatment. The inventors also found that the amount of residual austenite can be reduced by obtaining the lower bainite structure through isothermal transformation. Based on such findings, the inventors have accomplished the present invention.

The reason for adjusting the hardness to HRC=54 to 64 is because the hardness of less than 54 tends to encounter wear or deformation whereas the hardness in excess of 64 leads to reduced ductile-tough property and hence, to more likelihood of flaking.

The amount of residusal austenite is adjusted to not more than 5% for the purpose of preventing the aforementioned case where the residual austinite decomposes during the rolling motion, promoting the formation of the white layer.

The reason for adjusting the area percentage of $0.8 \mu m$ or longer secondary carbide to not more than 20% is because if the area percentage of such secondary carbide exceeds 20%, the effect of dispersing the operating stress is reduced.

Incidentally, SUJ2 is preferred as steel for use in the above bearing. Where SUJ2 is used, the mechanical properties thereof are more effectively improved by the isothermal transformation treatment and an excellent resisting function to the white layer formation can be attained. Thus is provided the bearing of long service life which is more preferably applied under conditions of high vibration and impact stress.

BEST MODES FOR CARRYING OUT THE INVENTION

Best modes for carrying out the present invention will herein below be described. However, it is to be noted that the present invention is not limited to these modes.

EXAMPLE 1

In Example 1, a workpiece constructed from SUJ2 was subjected to an austenitizing treatment at 840° C. for 40 minutes and then to an isothermal transformation treatment under conditions of 230° C. and one hour, thereby giving a stationary-side race for the bearing.

EXAMPLE 2

In Example 2, a stationary-side race for the bearing was obtained by performing the treatments under the same conditions as in Example 1, except that a holding time for the isothermal transformation treatment was four hours.

EXAMPLE 3

In Example 3, workpiece constructed from SUJ2 was subjected to the austenitizing treatment at 840° C. for 40 minutes. Subsequently, the isothermal transformation treatment was performed at a holding temperature of 260° C. for a holding time of one hour, thereby to obtain a stationary-side race for the bearing.

EXAMPLE 4

In Example 4, a stationary-side race for the bearing was obtained by performing the treatments under the same conditions as in Example 3, except that the holding time for the isothermal transformation treatment was four hours.

EXAMPLE 5

In Example 5, a workpiece constructed from SUJ2 was subjected to the austenitizing treatment at 840° C. for 40 minutes. Subsequently, the isothermal transformation treatment was performed at a holding temperature of 290° C. for the holding time of one hour, thereby to obtain a stationary-side race for the bearing. temperature of 290° C. for the holding time of one hour, thereby to obtain a stationary-side race for bearing.

EXAMPLE 6

In Example 6, a stationary-side race for the bearing was obtained by performing the treatments under the same conditions as in Example 5, except that the holding time for the isothermal transformation treatment was four hours.

The isothermal transformation treatment in Examples 1 to 6 was effected by immersing the respective workpieces in a salt bath heated to and maintained at a transformation treatment temperature.

Table 1 shows measurement results on the hardness and the amount of residual austenite of the respective stationary-side races subjected to the isothermal treatments of Examples 1 to 6.

TABLE 1

|  | Isothermal holding temperature (° C.) | Isothermal holding time (h) | Hardness (HRC) | Amount of residual austenite (%) |
| --- | --- | --- | --- | --- |
| EX. 1 | 230 | 1 | 61.0 | 4.5 |
| EX. 2 | 230 | 4 | 60.2 | 0.2 |
| EX. 3 | 260 | 1 | 57.8 | 3.1 |
| EX. 4 | 260 | 4 | 58.0 | 0.0 |
| EX. 5 | 290 | 1 | 55.7 | 0.0 |
| EX. 6 | 290 | 4 | 54.9 | 0.0 |

It was confirmed that the isothermal transformation treatments have transformed the material structures of Examples 1 to 6 to a lower bainite structure with fine dispersion of secondary carbide. As is apparent from Table 1, the amounts of residual autstenite in Examples 1 to 6 were reduced to less than 5%. The hardness after the isothermal transformation treatment was limited within a range of HRC=54–64, which the rolling bearing is required to exhibit in the light of wear resistance. In any of Examples 1 to 6, the area percentage of 0.8 μm or longer carbide was not more than 20% based on the total area of secondary carbide.

Next, the following test sample 1 and test sample 2 were subjected to a tensile test and impact test for comparison of mechanical properties (see Table 2).

As to the test sample 1, a tensile test piece and an impact test piece were each constructed from SUJ2 and subjected to the austenitizing treatment at 840° C. for 40 minutes. The resultant products were subjected to the isothermal transformation treatment for adjusting the hardness thereof to HRC=59, the amount of residual austenite to not more than 5%, and the area percentage of 0.8 μm or longer carbide to not more 20% based on the total area of the secondary carbide.

As to the test sample 2, a tensile test piece and an impact test piece were each constructed from SUJ2 and subjected to the normal process consisting of normal hardening/tempering, thereby adjusting the hardness thereof to the same level (HRC=59).

TABLE 2

|  | Material | Heat treatment | Elongation (%) | Reduction of area (%) | Impact (kJ/m$^2$) |
| --- | --- | --- | --- | --- | --- |
| Test sample 1 | SUJ2 | Isothermal transformation treatment | 5.6 | 14.0 | 500 |
| Test sample 2 | SUJ2 | Hardening/Tempering | 4.0 | 7.0 | 130 |

As is apparent from Table 2, the test sample 1 is superior to the test sample 2 in the all mechanical properties of elongation, reduction of area and impact value. That is, it is understandable that the mechanical properties of SUJ2 are improved by the above isothermal transformation treatment.

EXAMPLE 7

In Example 7, a workpiece constructed from SUJ2 was subjected to the austenitizing treatment at 840° C. for 40 minutes. Subsequently, the resultant product was subjected to the isothermal transformation treatment thereby giving a stationary-side race which was adjusted for the hardness to HRC=58.9, the amount of residual austenite to 0.5%, the area percentage of 0.8 μm or longer carbide to 15% based on the total area of the secondary carbide.

Comparative Example

In Comparative Example, a workpiece constructed from SUJ2 was subjected to the conventional hardening/tempering treatment thereby giving a stationary-side race which was adjusted for the hardness to HRC=62.6, the amount of residual austenite to 11.6%, and the area percentage of 0.8 μm or longer carbide to 25% based on the total area of the secondary carbide.

A rolling bearing was fabricated by combining each of the stationary-side races of Example 7 and Comparative Example with a rolling element and a rotary-side race which were constructed from SUJ2 subjected to the conventional hardening/tempering treatment. The resultant rolling bearings were each evaluated for life time of resistance to the white layer flaking, using a vibration generator for vibration test. The results are tabulated in Table 3.

TABLE 3

|  | Material | Heat treatment | Hardness (HRC) | Amount of residual austenite (%) | Life (h) |
| --- | --- | --- | --- | --- | --- |
| Example 7 | SUJ2 | Isothermal transformation treatment | 58.9 | 0.5 | >1000 |

TABLE 3-continued

| | Material | Heat treatment | Hardness (HRC) | Amount of residual austenite (%) | Life (h) |
|---|---|---|---|---|---|
| Comparative Example | SUJ2 | Hardening/ Tempering | 62.6 | 11.6 | 48–102 |

As is apparent from Table 3, the rolling bearing employing the race of Example 7 demonstrated the life time of resistance to flaking in excess of 1000 hours in contrast to the rolling bearing employing the race of Comparative Example which presented the life time of 48 to 102 hours before the occurrence of white layer flaking. It is thus proved that SUJ2 is a material to which a required hardness, excellent mechanical properties and a resisting function to the white layer formation can be imparted by the isothermal transformation treatment.

It was confirmed from the above results that the service life of the rolling bearing can be improved by transforming the structure of at least the stationary-side race to the lower bainite structure through the isothermal transformation treatment for adjustment of the hardness to HRC=54 to 64, the amount of residual austenite to not more than 5%, and the area percentage of 0.8 μm or longer carbide to not more than 20% based on the total area of the secondary carbide.

Incidentally, the aforesaid isothermal transformation treatment may also be applied to the rolling element or the rotary-side race for adjusting the hardness to HRC=54 to 64, the amount of residual austenite to not more than 5%, and the area percentage of 0.8 μm or longer carbide to not more than 20% based on the total area of the secondary carbide. It is noted that the material is not limited to SUJ2 alone but any of various steels is usable so long as it is adjusted, through the isothermal transformation treatment, for the hardness to HRC=54 to 64, the amount of residual austenite to not more than 5%, and the area percentage of 0.8 μm or longer carbide to not more than 20% based on the total area of the secondary carbide.

What is claimed is:

1. A rolling bearing comprising races and a rolling element each constructed from steel,
   wherein a structure of at least a stationary-side race is transformed into a lower bainite structure through isothermal transformation and is adjusted for hardness to HRC=54 to 64, an amount of residual austenite to not more than 5%, and an area percentage of 0.8 μm or longer carbide to not more than 20% based on a total area of secondary carbide.

2. The rolling bearing as claimed in claim 1, wherein said steel is SUJ2.

3. A method for improving ball bearings to avoid the occurrence of premature flaking of ball bearing raceway surface comprising:
   subjecting said ball bearing to a sufficient temperature to carry out austenitizing and thereafter an isothermal transformation treatment, wherein said austenitizing is carried out at temperature of at least 840° C. for at least 40 minutes.

4. A method for improving ball bearings to avoid the occurrence of premature flaking of ball bearing raceway surface comprising:
   subjecting said ball bearing to a sufficient temperature to carry out austenitizing and thereafter an isothermal transformation treatment, wherein said isothermal transformation is carried out for at least 1 hour at 230° C.

5. The method for improving ball bearings according to claim 4 wherein the temperature is selected from 230 to 290° C. at the time ranges from 1 hour to 4 hours.

6. A method for improving ball bearings to avoid the occurrence of premature flaking of ball bearing raceway surface comprising:
   subjecting said ball bearing to a sufficient temperature to carry out austenitizing and thereafter an isothermal transformation treatment, wherein the ball bearing is immersed into a salt bath for the isothermal transformation maintained at a transformation treatment temperature.

* * * * *